United States Patent
Ziger et al.

(10) Patent No.: US 10,866,262 B2
(45) Date of Patent: Dec. 15, 2020

(54) MULTI-AXIS POSITIONING DEVICE

(71) Applicant: GETEC MICROSCOPY GMBH, Vienna (AT)

(72) Inventors: Peter Ziger, Ehrenhausen (AT); Georg E. Fantner, Chavannes-Rennes (CH); Jeffrey M. Markakis, Santa Barbara, CA (US)

(73) Assignee: GETEC MICROSCOPY GMBH, Vienna (AT)

( * ) Notice: Subject to any disclaimer, the term of this patent is extended or adjusted under 35 U.S.C. 154(b) by 0 days.

(21) Appl. No.: 16/619,752

(22) PCT Filed: Jun. 7, 2018

(86) PCT No.: PCT/AT2018/060117
§ 371 (c)(1),
(2) Date: Dec. 5, 2019

(87) PCT Pub. No.: WO2018/223170
PCT Pub. Date: Dec. 13, 2018

(65) Prior Publication Data
US 2020/0141971 A1 May 7, 2020

(30) Foreign Application Priority Data

Jun. 9, 2017 (AT) .............................. A 50482/2017

(51) Int. Cl.
*G01Q 30/02* (2010.01)
*G01Q 10/00* (2010.01)
(Continued)

(52) U.S. Cl.
CPC .............. *G01Q 30/02* (2013.01); *B23Q 1/34* (2013.01); *G01Q 10/045* (2013.01); *G01Q 60/38* (2013.01); *G01Q 70/02* (2013.01)

(58) Field of Classification Search
CPC ........ B23Q 1/34; G01Q 30/02; G01Q 10/045; G01Q 60/38; G01Q 70/02; G01Q 10/04; G01B 7/34
(Continued)

(56) References Cited

U.S. PATENT DOCUMENTS 5,656,769 A      8/1997  Nakano et al.
2008/0295570 A1* 12/2008  Watanabe .............. B82Y 35/00
                                                    73/1.79
(Continued)

OTHER PUBLICATIONS

International Search Report for PCT/AT2018/060117 dated Aug. 30, 2018.

*Primary Examiner* — Nicole M Ippolito
(74) *Attorney, Agent, or Firm* — Workman Nydegger

(57) ABSTRACT

A device for microscopically precise positioning and guidance of a measurement or manipulation element in at least two spatial axes, comprising an outer base with side walls defining a base interior, and an xy-stage having side walls and mounting means for at least one measurement or manipulation element, the xy-stage being arranged inside of the base interior and being displaceable in an XY-plane relative to the outer base. The xy-stage is coupled to the outer base with bending elements, and with actuators designed for displacing the xy-stage relative to the outer base. The outer base is provided with at least one stiffening element rigidly connected to the side walls of the outer base, and/or that the xy-stage is provided with at least one stiffening element rigidly connected to the side walls of the xy-stage.

28 Claims, 4 Drawing Sheets

(51) Int. Cl.
   *G01Q 60/38* (2010.01)
   *G01Q 70/00* (2010.01)
   *B23Q 1/34* (2006.01)
   *G01Q 10/04* (2010.01)
   *G01Q 70/02* (2010.01)

(58) Field of Classification Search
   USPC .............. 250/440.11, 441.11, 442.11, 443.1; 850/1, 2, 3, 8, 9
   See application file for complete search history.

(56) References Cited

U.S. PATENT DOCUMENTS

| | | |
|---|---|---|
| 2011/0055982 A1 | 3/2011 | Watanabe et al. |
| 2012/0133756 A1* | 5/2012 | Levin ................ G02B 21/0008 348/79 |
| 2015/0089693 A1 | 3/2015 | Jesse |
| 2016/0274015 A1* | 9/2016 | Hadj Henni ............ G01N 3/34 |
| 2019/0003941 A1* | 1/2019 | Wikswo ................... G01N 3/20 |

* cited by examiner

MULTI-AXIS POSITIONING DEVICE

The present application is a U.S. National Stage of International Application No. PCT/AT2018/060117, filed on Jun. 7, 2018, designating the United States and claiming the priority of Austrian Patent Application No. A 50482/2017 filed on Jun. 9, 2017. All of the aforementioned applications are incorporated herein in their respective entireties by this reference.

The present invention relates in general to the field of the microscopically precise measurement of surfaces and, in particular, to scanning probe microscopy (SPM) and, specifically, to atomic force microscopy (AFM), which, in literature, is also referred to as scanning force microscopy (SFM).

More particularly, the invention relates to a device for microscopically precise positioning and guidance of a measurement or manipulation element in at least two spatial axes for the above-indicated technologies. Such a device is commonly referred to as a "scanner". In the above-mentioned applications, it is necessary to bring about a relative positioning and guidance between a sample or, respectively, a workpiece and a measurement or manipulation element. Mechanical scanners for this purpose are known from the patent literature, academic publications and products on the market.

From the documents U.S. Pat. Nos. 5,861,549 and 6,310,342, feeler heads (scanners) for SPM and AFM are known which have at least one flexure stage for scanning samples or workpieces in the x-, y- and/or z-direction(s). In one embodiment, the scanner comprises separate flexure stages for scanning in the x-, y-, and z-directions. In this case, an xy-stage, which is displaceable translationally in the x and y directions, carries the measurement or manipulation element, which is movable in the z-direction. The structure of the scanner comprises a fixed outer base to which an x-axis stage is coupled by means of bending elements. A y-axis stage is coupled to the x-axis stage by means of bending elements. The translation of the x-axis stage and of the y-axis stage is effected by actuators, which are preferably designed as piezoelectric elements.

Since a significant part of the applications for the above-mentioned scanners take place on a microscopic scale, the integration of scanners for SPM and, in particular, AFM into optical microscopy systems is desirable. However, for this purpose, it is advantageous to reduce the size of the scanners as much as possible, since a flexible integration of scanners for non-optical measuring and manipulation methods into existing microscope assemblies can be achieved in this way. The smaller the scanners can be designed, the greater the number of feasible applications. In particular, it is an object of the present invention to provide a device for precise positioning and guidance of a measurement or manipulating element in at least two spatial axes, which can be integrated into a scanning electron microscope (SEM).

Another essential aspect of the invention is that, despite the reduced size of the scanner, its mechanical properties are not deteriorated. In particular, the miniaturization of the scanner must not be at the expense of its rigidity, since otherwise the accuracy of the measurement results would be severely impaired.

But also the linearity of the bending elements depends on the ratio of the length of the bending element to its maximum deflection. The maximum deflection is, in turn, related to the maximum scan area.

The scanners disclosed in the above-mentioned documents U.S. Pat. Nos. 5,861,549 and 6,310,342 are unsuited for miniaturization because they require massive wall thicknesses of the individual stages in order to achieve sufficient rigidity. Due to such massive wall thicknesses, the size of the construction of those scanners has a lower limit, and the relatively high weight, in turn, limits the possible movement speed of the scanners.

It is the object of the present invention to provide a device for microscopically precise positioning and guidance of a measurement or manipulation element in at least two spatial axes, which overcomes or at least substantially alleviates the above-mentioned disadvantages of the prior art.

The invention achieves this object by providing a device having the features of claim 1. Advantageous embodiments of the invention are set forth in the subclaims and in the specification.

The scanner according to the invention offers the following advantages:

- It has small external dimensions and a low weight and is highly accurate, linear and fast despite the small external dimensions and the low weight.
- It is integratable into optical microscopes and inspection systems, such as scanning electron microscopes (SEM), X-ray photoelectron spectroscopy (XPS), focused ion beam (FIB), or combined systems such as dual-beam (DB) systems, which is understood to be the integration of SEM and FIB into a device, as well as into vacuum coating chambers.
- By means of it, samples of an unrestricted large size (e.g., gears, turbine blades) can be examined also in places which are difficult to access.
- A variety of different measurement or manipulation elements can be fitted on it, such as, e.g., sensors which can be designed as cantilevers, in particular SPM or AFM cantilevers, wherein the measurement or manipulation elements can be arranged on a limb of the scanner in an exposed position.
- The travel paths in the different axes are followed with high precision, and there is only very little interaction between the movements in various axes.
- There is a substantial constructional (structural) independence of the part of the scanner which is displaceable in the XY-plane from the measurement and/or manipulation element displaceable in the z-direction.
- The displaceability of the scanner can be reproduced accurately, the scan linearity is high, the travel paths are wide, and the scanner exhibits only a very small tendency to wobble or, respectively, angular errors during the movement.
- The natural frequency (first resonance frequency) of the scanner is very high and therefore allows high scanning frequencies.
- The overall rigidity of the device and short mechanical paths between the point where the scanner is fixed (reference point) and the sensor (e.g., designed as a cantilever) result in insensitivity to accelerations and vibrations, which act upon the scanner from the outside.

The present invention relates to a device for microscopically precise positioning and guidance of a measurement or manipulation element in at least two spatial axes, comprising an outer base with side walls defining a base interior, and an xy-stage having side walls and mounting means for at least one measurement or manipulation element, the xy-stage being arranged inside of the base interior and being displaceable in a plane relative to the outer base, wherein the xy-stage is coupled to the outer base with bending elements, and with actuators designed for displacing the xy-stage relative to the outer base, characterized in that the outer base is provided with at least one stiffening element rigidly connected to the side walls of the outer base and/or that the xy-stage is provided with at least one stiffening element rigidly connected to the side walls of the xy-stage.

In this case, the xy-stage can be arranged kinematically in parallel, whereby a simple and compact design is facilitated.

In an advantageous embodiment of the invention, the xy-stage is composed of a y-stage displaceable in a first spatial axis by means of at least one of the actuators and an x-stage displaceable in a second spatial axis orthogonal to the first spatial axis by means of at least one of the actuators, wherein the y-stage comprises side walls defining an interior and the x-stage is arranged within the interior of the y-stage, with the y-stage being coupled to the outer base with bending elements, with the x-stage being coupled to the y-stage with bending elements, wherein the mounting means for at least one measurement or manipulation element is formed at the x-stage, and wherein the y-stage is provided with at least one stiffening element rigidly connected to the side walls of the y-stage, wherein, optionally, also the x-stage is provided with at least one stiffening element. In this case, the xy-stage is kinematically arranged in series, whereby a decoupling of the two directions of movement along the first and second spatial axes is facilitated.

Advantageously, the stiffening elements are arranged essentially at the top and/or the bottom of their associated side walls.

According to the invention, the stiffening elements can follow, possess or unite elements of two stiffening principles without limiting universality: On the one hand, they close a structure which is open (in the XY-plane), which greatly increases the stiffness—with comparable parameters of weight and size. On the other hand, they permit a cup or box structure, which—with comparable parameters of weight and size—increases torsional rigidity and general rigidity.

Particularly advantageously, the stiffening elements are connected to their associated side walls at several points or at line-shaped portions or at flat portions, optionally with the interposition of spacers. The latter can be configured at any location as part of the side walls, generally as part of the xy-stage, as part of the stiffeners, or as separate parts. This ensures the displaceability of the xy-stage.

In a particularly advantageous embodiment of the invention, the stiffening elements are arranged essentially symmetrically both at the top and at the bottom. This symmetrical arrangement constitutes a mirror symmetry to a plane of symmetry, which is preferably essentially parallel to the XY-plane, an XZ-plane or a YZ-plane. The following elements can be arranged in this mirror symmetry:
the stiffening element of the x-stage
the stiffening element of the y-stage
the stiffening element of the x/y-stage
bending elements of the x-stage
bending elements of the y-stage
bending elements of the x/y-stage Preferably, at least one scanner stage (bending elements and stiffeners), particularly preferably the entire x/y scanner, has a plane of symmetry which is essentially horizontal in the installation position, with the top substantially corresponding to the mirror image of the bottom. As a result, the drive, spring, inertial and all other forces and torques largely cancel each other out, which minimizes the movements outside of the XY-plane.

A favourable design of the invention includes an essentially plate-shaped construction of the bending elements and/or the individual stiffening elements or the entire base.

In an advantageous embodiment of the invention, one of the stiffening elements is designed as a plate. The fittings of the scanner according to the invention are thus completely protected.

In a further advantageous embodiment of the invention, at least one of the stiffening elements is designed as a web, wherein preferably a plurality of webs are combined to form a framework. As a result, the scanner according to the invention becomes light and stiff.

If the stiffening elements are designed so as to be connectable, in particular screwable, firmly, e.g., in a form-fitting or force-fitting manner, with their associated side walls, accessibility to the fittings is advantageously ensured for repair and maintenance.

Advantageously, the side walls of the outer base are higher than the overall height of the xy-stage. As a result, free movability of the fittings in the base interior is ensured.

In a kinematic serial configuration, the side walls of the y-stage are higher than the overall height of the x-stage. As a result, free movability of the fittings in the interior is ensured.

In an advantageous embodiment of the invention, the outer base has, on one side, a recess configured as an opening in the side wall of the outer base, which side wall is disposed on this side, or in the form of an omission of a part of this side wall or of the entire side wall, wherein, optionally, the xy-stage also has, on this side, a recess configured as an opening in the side wall of the xy-stage or in the form of an omission of a part of this side wall or of the entire side wall. As a result, the advantages are obtained that a weight reduction is achieved, the measurement or manipulation element can be guided toward the outside on this side, and, alternatively, this side can be used for a bending element.

Due to this opening, the stability of the outer base and/or of the xy-stage is possibly impaired. Therefore, in a particularly advantageous embodiment of the invention, these structures are reclosed, in particular by a continuation of the stiffening elements above and/or below those structures.

In an advantageous embodiment of the invention, the sum of all hollow spaces, i.e., spaces without "structural material", within the device is at least 30% of the total volume of the device. As a result, the first resonance frequency is high due to the low weight, and the device can be operated very fast.

In a further embodiment of the invention, the hollow spaces are filled at least partially with a soft, damping material, for example, with NBR, Viton, silicone rubber, foam or aerogel. Among other things, the susceptibility to resonance of the scanner can thereby be reduced.

Advantageously, if the side walls of the outer base have at least on half of their total length a ratio of the height of the wall to the thickness of at least 1:1, preferably of at least 3:1, particularly preferably of at least 5:1, and/or if the side walls of the xy-stage have at least on half of their total length a ratio of the height of the wall to the thickness of at least 1:1, preferably of at least 2:1, the weight and the dimensions can be reduced further.

In an advantageous embodiment of the invention, a holder is formed at the mounting means for the at least one measurement or manipulation element. The holder advantageously has a cradle on which the at least one measurement or manipulation element, in particular an SPM cantilever, for example, an AFM cantilever for detecting and outputting at least one measured variable, e.g., deflection, temperature, electrical potential, magnetic field strength, etc., is attachable by means of a connection.

Advantageously, said cradle has non-destructively detachable connections for the transmission of electric signals from and/or to the measurement or manipulation element. Thus, the measurement or manipulation element can easily and quickly be connected mechanically and electrically to the holder.

Advantageously, the holder furthermore comprises a deflectable portion, preferably in the form of a recess, and an actuator which deflects the deflectable portion and thus causes a free end of the holder to move in a plane orthogonal to the plane in which the xy-stage is displaceable. For this purpose, the holder preferably has at least one joint, particularly preferably four joints.

In the installation position of the device according to the invention, the free end of the cradle advantageously forms an at least local extreme point within the XY-plane and/or the XZ-plane. The free end of the cradle can form the lowest point within the XZ-plane in the installation position of the device. Therefore, if a cantilever is attached to the cradle, the tip of this cantilever forms the local extreme point. Due to this arrangement of the cradle at the local extreme point, or, respectively, of the cantilever attached thereto, firstly, the visibility of the cantilever from above (e.g., in the electron beam) is ensured and, secondly, the possibility of imaging very large samples, in particular if they are flat or convex, is obtained.

Advantageously, a first signal processing stage and/or signal amplification stage for the electrical signal from the measurement or manipulation element is arranged in the region of the device. As a result, the measurement signal can be improved, for example, by reducing or eliminating electrical noise signals.

In a particularly advantageous embodiment of the invention, the holder has an oscillator at its free end, in particular in the region of the cradle, for example, between the holder and the measurement or manipulation element, with a mechanical connection for vibration transfer existing between the oscillator and the SPM cantilever. As a result, the measurement or manipulation element can advantageously be set in vibration independently of the holder, optionally in addition to the movement of the holder.

Particularly advantageously, the holder furthermore comprises an adjusting means for a resting position of the free end of the holder, whereby simple adjustability and adaptability to the respective application purpose is enabled.

Alternatively, the passage for the measurement element or, respectively, the manipulation element can also be arranged at the top and/or the bottom of the outer base and/or the xy-stage, for example, via an opening/recess/omission in the relevant region in the stiffening structure.

The actuators of the invention are advantageously configured as piezoelectric elements, voice coils, thermal actuators such as bimetallic elements or elements for thermal structural transformation, electrostatic drives or servo motors.

Particularly advantageously, the actuators are arranged such that they partially protrude from the outer base, wherein, optionally, the actuators are arranged at least partially in a housing.

This enables a small frame size of the outer base and the xy-stage, with the housing protecting the actuators.

In an advantageous embodiment of the invention, the bending elements have an essentially rectangular cross-section, whereby high torsional rigidity and high rigidity in all directions except those intended for movement are enabled.

In an advantageous embodiment of the invention, position sensors or travel-distance or, respectively, expansion sensors acting as position sensors and/or angle sensors, or combinations of expansion and angle sensors are arranged on the stiffening elements, whereby position detection and, optionally, control are facilitated.

In an advantageous embodiment of the invention, contact points for preload elements are arranged on the stiffening elements, or, in sections, they themselves are configured as preload elements, wherein the preload elements are configured to preload at least one of the actuators into a defined position or, respectively, into a defined (force/path) operating point.

Particularly advantageously, the device according to the invention is used as part of a scanning probe microscope, in particular an atomic force microscope, which scanning probe microscope is added to a host system, in particular a scanning electron microscope, an X-ray photoelectron spectroscope, a focused ion beam system, or a combined system (a dual-beam system).

In the following, the device according to the invention is explained in further detail in a non-limiting manner with reference to exemplary embodiments illustrated in the drawings.

Figure 1:
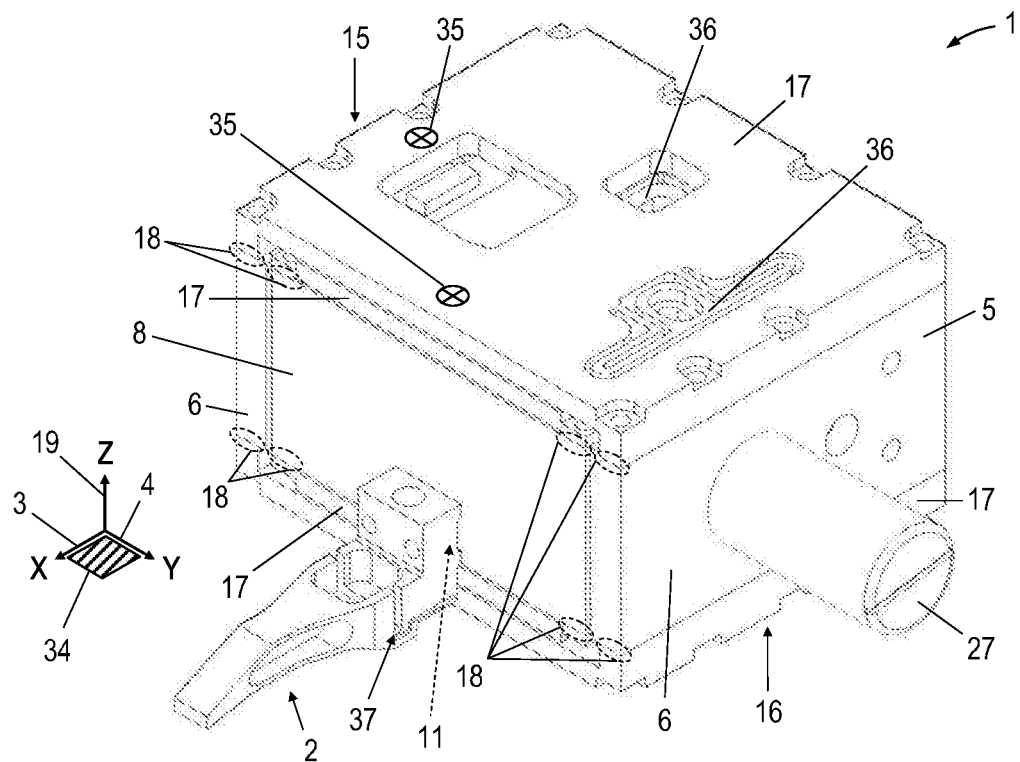
FIG. 1 shows a device according to a first embodiment of the invention in a perspective view from above.
Figure 2:
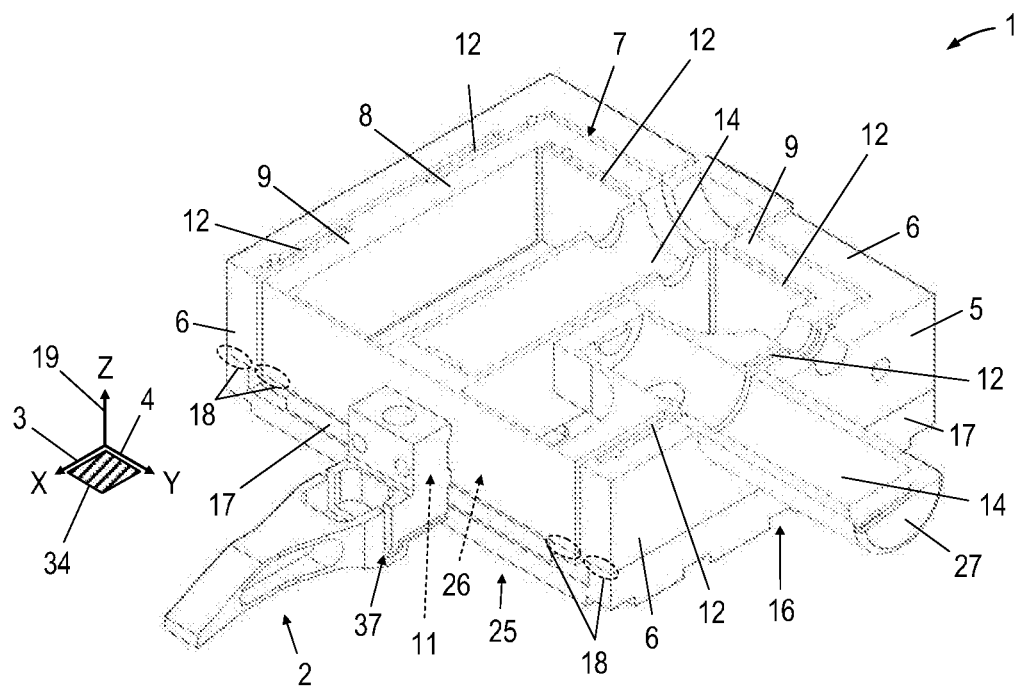
FIG. 2 shows an X-Y-section of the device according to FIG. 1 in a perspective view from above.
Figure 3:
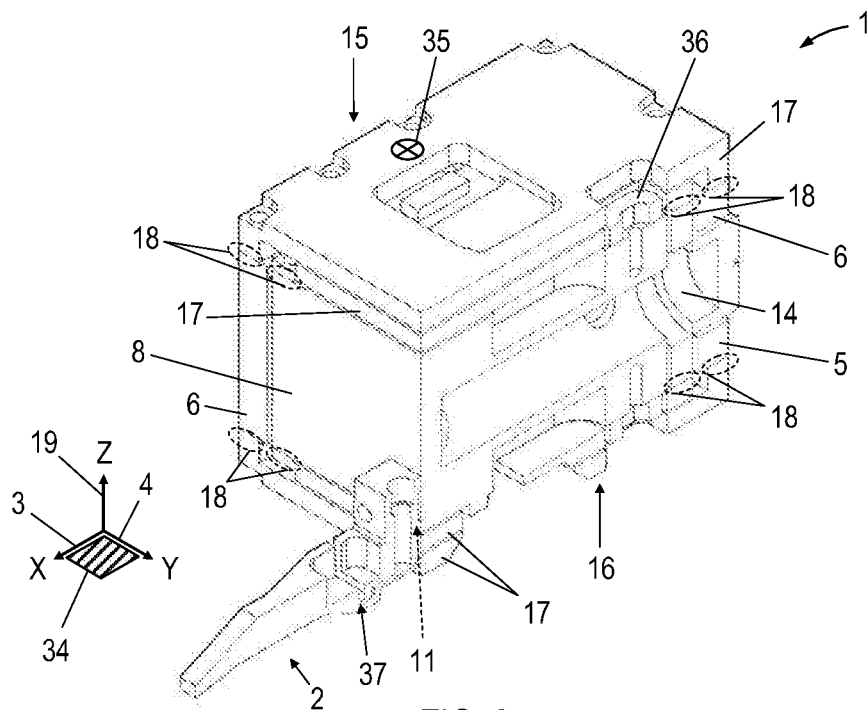
FIG. 3 shows an X-Z-section of the device according to FIG. 1 in a perspective view from above.
Figure 4:
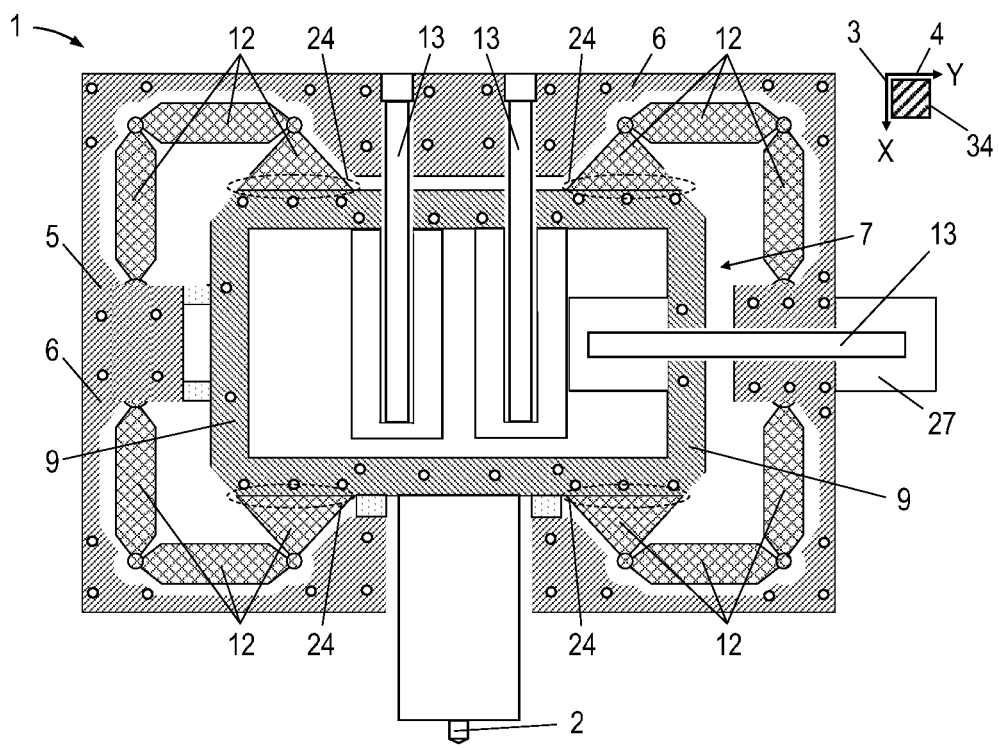

FIG. 4 schematically shows an X-Y-section of a device according to the invention with a kinematically parallel xy-stage.

Figure 5:
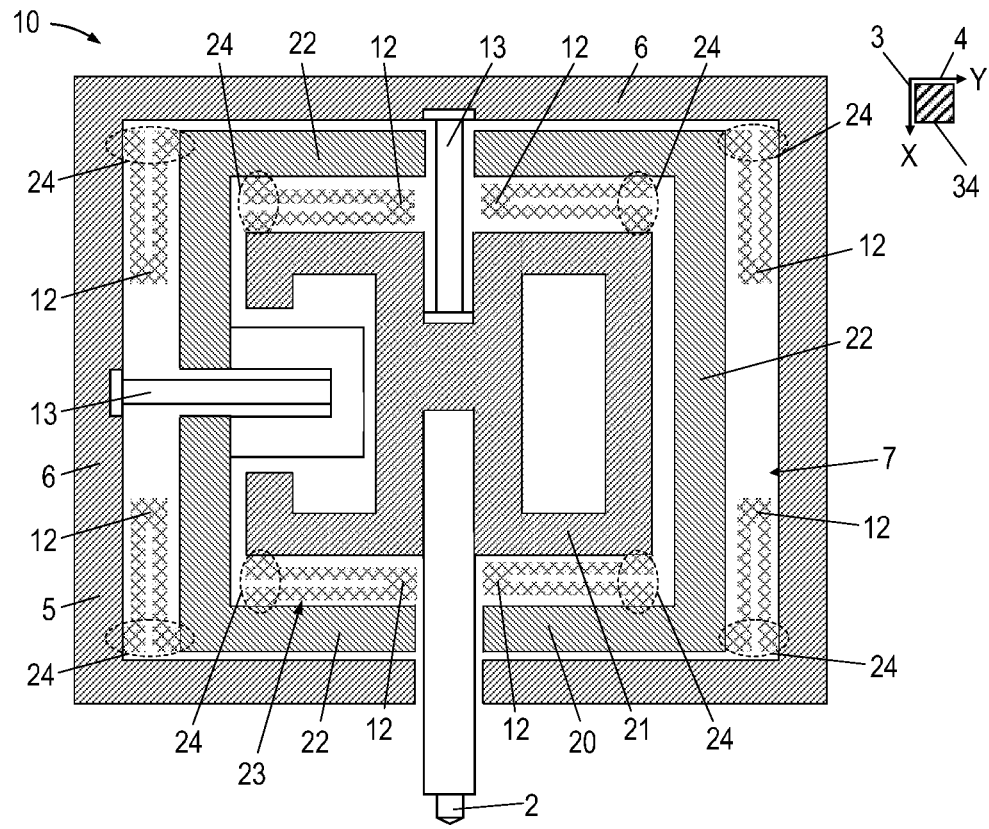

FIG. 5 schematically shows an X-Y-section of a device according to a second embodiment of the invention.

Figure 6:
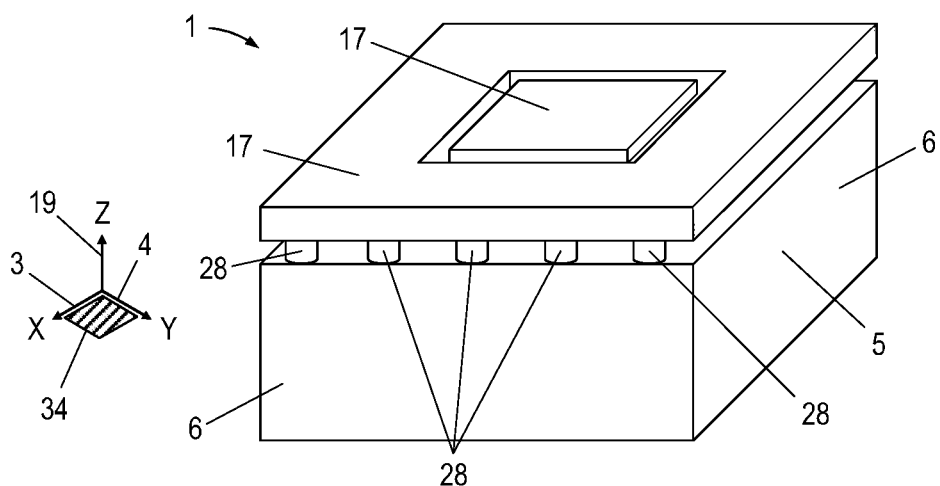

FIG. 6 schematically shows a device according to a further embodiment of the invention in a perspective view from above.

Figure 7:
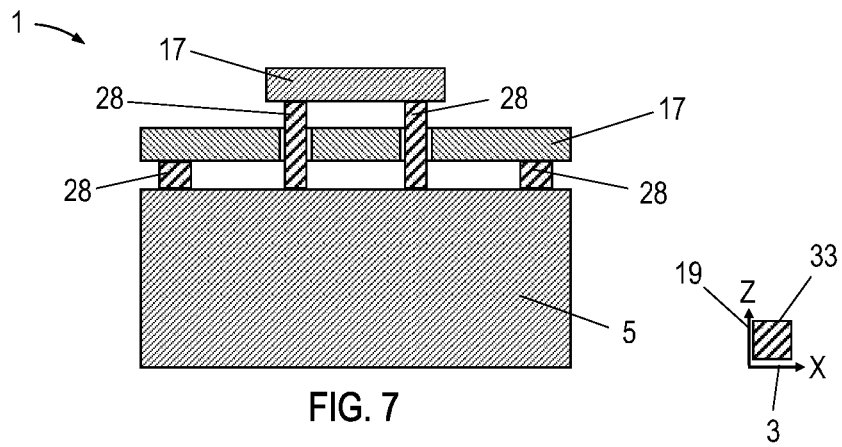

FIG. 7 schematically shows an X-Z-section of a device according to a further embodiment of the invention.

Figure 8:
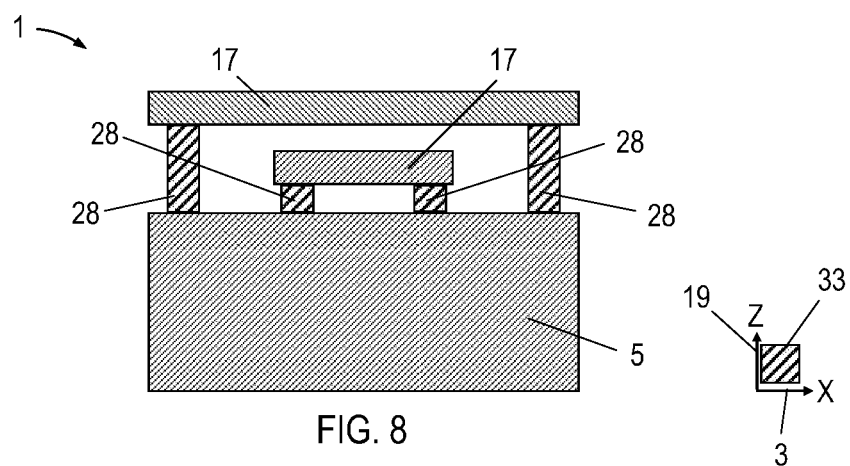

FIG. 8 schematically shows an X-Z-section of a device according to a further embodiment of the invention.

Figure 9:
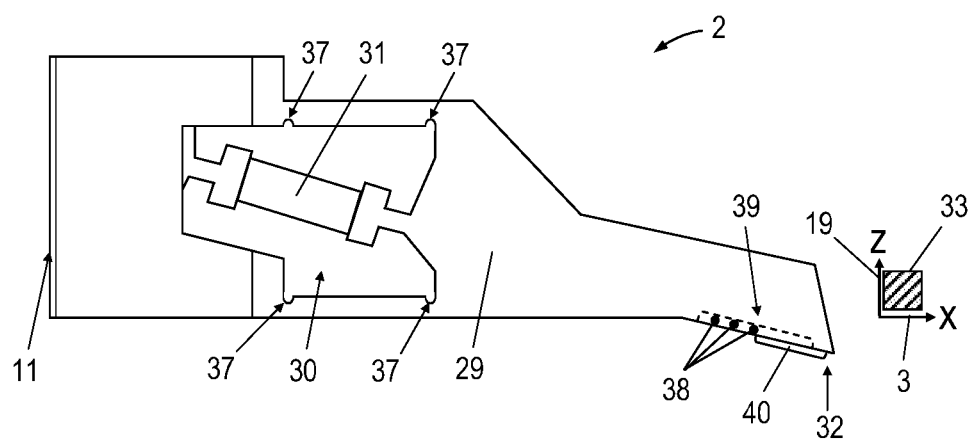

FIG. 9 schematically shows a holder 2 according to the invention designed as a Z-stage for a measurement or manipulation element in a view normal to the X-Z-plane.

In the following, reference is made to FIGS. 1-4. They show a device 1 for microscopically precise positioning and guidance of a measurement or manipulation element in two spatial axes, which spatial axes point along an X-axis 3 and a Y-axis 4 in the present figures and, furthermore, are referred to as such. The X-axis 3 and the Y-axis 4 are orthogonal to each other and define an-XY plane 34 in the three-dimensional space. Alternatively, the spatial axes can be named arbitrarily, can be placed at any desired angle with respect to one another and can be aligned relative to each other arbitrarily in the three-dimensional space.

The device 1 has an outer base 5 with side walls 6 defining a base interior 7. Within the base interior 7, an xy-stage 8 with side walls 9 is arranged, which is movable relative to the outer base 5 in the XY-plane 34. The outer base 5 has, on one side 25, a recess 26 designed in the form of an omission of a side wall 6 or, respectively, a side wall 9 of the base 5 or, respectively, the xy-stage 8. Alternatively, only a portion of the side walls 6 and 9 can be omitted, or, respectively, a person skilled in the art-related field will be aware of possible further alternatives. On this side 25, a holder 2 for the measurement or manipulation element is guided to the outside, wherein the holder 2, which has a joint 37, is attached to a mounting means 11. Alternatively, the xy-stage 8 may comprise several mounting means 11. Alternatively, the mounting means 11 can be configured for the attachment of several holders 2.

The sum of all hollow spaces within the device 1 is more than 30% of the total volume of the device 1, and the side walls 6 of the outer base 5 have at least on half of their total length a ratio of the height of the wall to the thickness of the wall of more than 2:1, and the side walls 9 of the xy-stage 8 have at least on half of their total length a ratio of the height of the wall to the thickness of the wall of more than 2:1.

The xy-stage 8 is coupled to the outer base 5 via bending elements 12, which, in the present example, are designed as plate-shaped spring elements, and via actuators 13 designed for displacing the xy-stage 8 relative to the outer base 5. The bending elements 12 may have a polygonal, e.g., a square or rectangular, a round, an elliptical or any other arbitrary cross-section. The bending elements 12 can be designed in pairs so as to be meandering or linear, and substantially symmetrical, and include four suspension points 24 by means of which the xy-stage 8 is fixed to the outer base 5. The bending elements 12 may be compliant either across their entire length or only in sections. The bending elements 12 are not preloaded, but, alternatively, can be preloaded into a resting position.

The actuators 13 are designed as piezoelectric actuators, e.g., piezo tubes or piezoelectric cylinders, which are introduced into cylindrical recesses 14. Alternatively, the actuators 13 can be designed as piezo-operated lever structures, voice coils, thermal actuators such as bimetallic elements or elements for structural transformation, electrostatic drives or servo motors. The actuators 13 directly move the xy-stage 8. Alternatively, the actuators 13 can also control the xy-stage 8 indirectly via levers, joints or the like. A person skilled in the art-related field will be aware of possible alternatives.

An actuator 13 protrudes partially from the outer base 5, wherein it is at least partially disposed in a housing 27 having the cylindrical recess 14. This enables a small frame size of the outer base 5 and the xy-stage 8, with the housing 27 protecting the actuator 13. Alternatively, the actuators 13 may also be arranged completely within the outer base 5.

FIG. 5 shows a device 10 according to a second embodiment of the invention. In this case, the xy-stage 8 is composed of a y-stage 20 movable along the Y-axis 4 by means of one of the actuators 13 and an x-stage 21 movable along the X-axis 3 by means of one of the actuators 13. As a result, a substantial decoupling of the two directions of movement along the X-axis 3 and the Y-axis 4 is facilitated. In this case, the y-stage 20 has side walls 22 which define an interior 23, and the x-stage 21 is arranged within the interior 23 of the y-stage 20. The y-stage 20 is coupled to the outer base 5 via bending elements 12. The x-stage 21 is coupled to the y-stage 20 via bending elements 12. The x-stage 21 has the mounting means 11 for the holder 2 for the measurement or manipulation element. Alternatively, the x-stage 21 may comprise several mounting means 11.

The bending elements 12 are designed in pairs so as to be meandering and substantially symmetrical and have four suspension points 24 or, respectively, solid-state joints by means of which the y-stage 20 is attached to the outer base 5 and, respectively, the x-stage 21 is attached to the y-stage 20.

In the two above-described embodiments, the outer base 5 and the xy-stage 8 are provided with stiffening elements 17 on their top 15 and bottom sides 16. The top sides 15 and the bottom sides 16 are parallel to the XY-plane 34 and are located along a vertically oriented Z-axis 19 above and below the side walls 6 and 9, respectively.

In the present first embodiment of the invention, the stiffening element 17 forms a cover of the outer base 5 on the top side 15 of the outer base 5, and the stiffening element 17 forms a cover of the xy-stage 8 on the top side 15 of the xy-stage 8; the stiffening element 17 on the bottom side 16 of the outer base 5 forms a bottom of the outer base 5, and the stiffening element 17 on the bottom side 16 of the xy-stage 8 forms a bottom of the xy-stage 8. In this case, the stiffening elements 17 are configured as U-shaped plates, which are screwable to the outer base 5 in a force-fitting manner. On line-shaped portions 18, the stiffening elements 17 are rigidly connected to their associated side walls 6 of the outer base 5, to the side walls 9 of the xy-stage 8, or optionally to the side walls 22 of the y-stage 20. The stiffening elements 17 of the outer base 5 are located above or, respectively, below the stiffening elements 17 of the xy-stage 8, and the legs of the U-shaped plates form spacers 28 at the line-shaped portions 18, whereby movability of the xy-stage 8 is ensured.

Alternatively, the Z-axis 19 can be oriented arbitrarily in the three-dimensional space, with a person skilled in the art-related field being able to appropriately assign the terms "top sides" 15 and "bottom sides" 16 and, respectively, "above" and "below".

Alternatively, the stiffening elements 17 can be connected to their associated side walls 6 and 9 at several points or at flat portions. Alternatively, the stiffening elements 17 can be riveted, glued, soldered, welded or heat-shrunk to the outer base 5 and/or the xy-stage 8, or, respectively, a person skilled in the art-related field will be aware of possible further alternatives.

Alternatively, the side walls 6 of the outer base 5 can be higher than the overall height of the xy-stage 8, whereby free movability of the fittings in the base interior 7 is guaranteed. Similarly, the side walls of the y-stage 20 can be higher than the total overall of the x-stage 21, whereby free movability of the fittings in the interior 23 is guaranteed. Alternatively, the stiffening elements 17 may also be formed as webs, wherein preferably a plurality of webs are combined to form a framework.

Exemplary and/or alternative structural embodiments of the stiffening elements 17 and of associated fasteners on their associated side walls 6 of the outer base 5, side walls 9 of the xy-stage 8 and, optionally, side walls 22 of the y-stage 20 are schematically illustrated in FIGS. 6-8. FIG. 6 shows a device 1 according to the invention with an outer plate-shaped stiffening element 17, which is attached above the outer base 5 via spacers 28, which are configured as individual parts, and a further inner plate-shaped stiffening element 17, which is attached above the xy-stage 8 (not visible). FIG. 7 shows a device 1 according to the invention similar to the device 1 according to FIG. 6, wherein the inner stiffening element 17 is located above the outer stiffening element 17. The two stiffening elements 17 are mounted to the outer base 5 and, respectively, the xy-stage 8 (not visible) via spacers 28, with the spacers 28 of the inner stiffening element 17 being guided through the outer stiffening element 17. In FIG. 8, the inner stiffening element 17 is located below the outer stiffening element 17, and the two stiffening elements 17 are mounted to the outer base 5 and, respectively, the xy-stage 8 (not visible) via spacers 28.

Furthermore, contact points 35 for position sensors can be arranged on the stiffening elements 17, whereby an indirect position evaluation and control of the holder 2 and thus of the measurement and manipulation element is rendered possible, because a change in the position and/or rotation of the stiffening elements 17 relative to each other can be indicative of the change in the position and/or rotation of the holder 2. In this connection, the term "position evaluation" thus denotes the translation and/or rotation of the parts or sections, in particular of the contact points 35 of the stiffening elements 17, relative to each other.

Furthermore, preload elements 36 can be formed at the stiffening elements 17, which preload elements are configured either as an integrated section of the stiffening elements 17 or as separate parts. The preload elements 36 are designed for preloading at least one of the actuators 13 into a defined position.

Also, only one respective stiffening element 17 can alternatively be provided at the top sides 15 or at the bottom sides 16 of the outer base 5 and the xy-stage 8. Alternatively, a stiffening element 17 may also be provided at the top side 15 of the outer base 5, and a stiffening element 17 may be provided at the bottom side 16 of the xy-stage 8, or a stiffening element 17 may be provided at the top side 15 of the xy-stage 8, and a stiffening element 17 may be provided at the bottom side 16 of the outer base 5.

FIG. 9 shows the holder 2 with four joints 37 for the measurement or manipulation element in a schematic illustration. The mounting means 11 is preferably designed as a dovetail joint element. As a result, different holders 2 can be attached depending on the intended use, whereby a stable, simple and reliable connection is ensured.

The holder 2 has a deflectable portion 29 with a recess 30, and an actuator 31 which deflects the deflectable portion 29 and thus causes a free end 32 of the holder 2, via the four joints 37, to move in a plane which, in the present embodiment, is the XZ-plane 33, which is orthogonal to the plane in which the xy-stage 8 is displaceable, which, in the present embodiment, is the XY-plane 34. Consequently, the holder 2 is designed as the Z-stage.

The holder 2 has a cradle 39 to which at least one measurement or manipulation element, in particular an SPM cantilever, e.g., an AFM cantilever, is attachable by means of a connection. The cradle 39 comprises non-destructively detachable connections 38 for transmitting electrical signals from and/or to the measurement or manipulation element. For example, the cradle 39 may have a design according to or similar to a (plug) socket for an electronic component.

Furthermore, the holder 2 has an oscillator 40, e.g., a piezoelectric element, on its free end 32 in the region of the cradle 39, wherein a mechanical connection for vibration transfer can be established between the oscillator 40 and the measurement or manipulation element.

Furthermore, the holder 2 may comprise an adjusting means for a resting position of the free end 32 of the holder 2, whereby simple adjustability and adaptability to the respective application purpose is enabled.

The outer base 5, the xy-stage 8 and, respectively, the y-stage 20 and the x-stage 21 as well as the bending elements 12 can be manufactured in one piece, for example, using 3D printing or by means of material removal by milling and/or spark erosion, or from any number of individual parts. The material or, respectively, the "structural material" from which those components are made or manufactured, can be arbitrary, but advantageously is made of stainless steel, steel, aluminium, titanium as well as alloys of those metals, high-performance plastic, fibre-reinforced plastic such as, e.g., glass fibre-reinforced or carbon fibre-reinforced plastic, high-performance ceramics or ceramics.

The device 1 according to the invention can be used as a part, in particular as an XY-scanner or as an XYZ-scanner, of a scanning probe microscope, in particular an atomic force microscope, which scanning probe microscope is added to a host system, in particular a scanning electron microscope, an X-ray photoelectron spectroscope, a focused ion beam system, or a combined system, for example, a dual-beam system.

Furthermore, the device 1 according to the invention can be used as a part, in particular as an XY-scanner or as an XYZ-scanner, of a profilometer which is added to a host system, in particular a scanning electron microscope, an X-ray photoelectron spectroscope, a focused ion beam system or a dual-beam system.

Furthermore, the device 1 according to the invention can be used for microscopically precise positioning and guidance of a measurement or manipulation element in at least two spatial axes for compact mechatronic positioning units, for example, as part of a lithography system or of an optical system, for example, of a laser system.

The invention claimed is:

1. A device for microscopically precise positioning and guidance of a measurement or manipulation element in at least two spatial axes, comprising an outer base with side walls defining a base interior, and an xy-stage having side walls and mounting means for at least one measurement or manipulation element, the xy-stage being arranged inside of the base interior and being displaceable in an XY-plane relative to the outer base, wherein the xy-stage is coupled to the outer base with bending elements and wherein the outer base and the xy-stage have top sides and bottom sides which are parallel to the XY-plane, and with actuators designed for displacing the xy-stage relative to the outer base, and the xy-stage is provided with at least one stiffening element rigidly connected to the side walls of the xy-stage.

2. A device according to claim 1, wherein the outer base is provided with at least one stiffening element rigidly connected to the side walls of the outer base.

3. A device according to claim 2, wherein the stiffening elements are arranged essentially at the top and/or the bottom of their associated side walls.

4. A device according to claim 2, wherein the stiffening elements are connected to their associated side walls at several points or at line-shaped portions or at flat portions, with the interposition of spacers.

5. A device according to claim 2, wherein one of the stiffening elements is a plate.

6. A device according to claim 2, wherein one of the stiffening elements is a web, and a plurality of webs together form a framework.

7. A device according to claim 2, wherein the stiffening elements are screwable, with their associated side walls in a force-fitting and/or form-fitting manner.

8. A device according to claim 1, wherein the xy-stage comprises a y-stage displaceable in a first spatial axis by at least one of the actuators and an x-stage displaceable in a second spatial axis orthogonal to the first spatial axis by at least one of the actuators, wherein the y-stage comprises side walls defining an interior and the x-stage is arranged within the interior of the y-stage, with the y-stage being coupled to the outer base with bending elements, with the x-stage being coupled to the y-stage with bending elements, wherein the mounting means for at least one measurement or manipulation element is formed at the x-stage, and the y-stage is provided with at least one stiffening element rigidly connected to the side walls of the y-stage, and the x-stage is provided with at least one stiffening element.

9. A device according to claim 8, wherein one type of elements of the following group is arranged in a symmetrical arrangement to a plane of symmetry which is essentially parallel to the XY-plane and/or an XZ-plane and/or a YZ-plane: stiffening elements of the xy-stage, stiffening elements of the y-stage, stiffening elements of the x-stage, bending elements of the xy-stage, bending elements of the y-stage and bending elements of the x-stage.

10. A device according to claim 8, wherein the side walls of the y-stage are higher than the overall height of the x-stage.

11. A device according to claim 1, wherein the side walls of the outer base are higher than the overall height of the xy-stage.

12. A device according to claim 1, wherein the outer base has, on one side, a recess configured as an opening in the side wall of the outer base, which side wall is disposed on this side, or in the form of an omission of a part of this side wall or of the entire side wall, wherein, the xy-stage also has, on this side, a recess configured as an opening in the side wall of the xy-stage or in the form of an omission of a part of this side wall or of the entire side wall.

13. A device according to claim 1, wherein a sum of all hollow spaces within the device is at least 30% of a total volume of the device.

14. A device according to claim 1, wherein the side walls of the outer base have at least on half of their total length a ratio of the height of the wall to the thickness of the wall at least 1:1, and/or the side walls of the xy-stage have at least on half of their total length a ratio of the height of the wall to the thickness of at least 1:1.

15. A device according to claim 1, further comprising a holder formed at the mounting means for the at least one measurement or manipulation element.

16. A device according to claim 15, wherein the holder comprises a deflectable portion with a recess which comprises an actuator operable to deflect the deflectable portion and cause a free end of the holder to move via at least one joint, in the XZ-plane, which is orthogonal to the plane in which the xy-stage is displaceable.

17. A device according to claim 16, wherein the holder has an oscillator at its free end, in particular in the region of the cradle between the holder and the measurement or manipulation element, with a mechanical connection for vibration transfer existing between the oscillator and the measurement or manipulation element.

18. A device according to claim 16, wherein the holder comprises an adjusting means for a resting position and/or preloading of the free end of the holder.

19. A device according to claim 15, wherein the holder has a cradle for the at least one measurement or manipulation element, at its free end, with the cradle enabling a connection between the holder and the at least one measurement or manipulation element, and the measurement or manipulation element comprises either an SPM cantilever or an AFM cantilever.

20. A device according to claim 19, wherein the cradle has non-destructively detachable connections for the transmission of electric signals from and/or to the measurement or manipulation element.

21. A device according to claim 20, wherein a first signal processing stage and/or signal amplification stage for the electrical signal from the measurement or manipulation element is arranged in a region of the device.

22. A device according to claim 19, wherein the free end of the cradle forms a local extreme point within the XY-plane and/or the XZ-plane in the installation position of the device.

23. A device according to claim 1, wherein the actuators are piezoelectric elements, voice coils, thermal actuators, electrostatic drives, or servo motors.

24. A device according to claim 1, wherein the actuators are arranged such that they partially protrude from the outer base, and the actuators are arranged at least partially in a housing.

25. A device according to claim 1, wherein the bending elements have an essentially rectangular cross-section in the XZ-plane and/or in the YZ-plane.

26. A device according to claim 1, wherein contact points for position sensors are arranged on the stiffening elements.

27. A device according to claim 1, further comprising preload elements arranged on the stiffening elements, either as an integrated section of the stiffening elements or as separate parts, with the preload elements configured to preload at least one of the actuators into a defined position.

28. The use of a device according to claim 1 as part of an atomic force microscope which is added to a host system, the host system comprising one of a scanning electron microscope, an X-ray photoelectron spectroscope, a focused ion beam system, or a combined system, and the combined system comprises one of a dual-beam system or a vacuum coating chamber.

* * * * *